(12) United States Patent
Theodosakis et al.

(10) Patent No.: US 12,662,111 B2
(45) Date of Patent: Jun. 23, 2026

(54) CONTROLLING VEHICLES BASED ON CURRENT MOTION CHARACTERISTICS

(71) Applicant: Textron Innovations Inc., Providence, RI (US)

(72) Inventors: Gregory August Theodosakis, Martinez, GA (US); Russell William King, Evans, GA (US); Jonathan Daniel Bowen, North Augusta, SC (US)

(73) Assignee: Textron Innovations Inc., Providence, RI (US)

( * ) Notice: Subject to any disclaimer, the term of this patent is extended or adjusted under 35 U.S.C. 154(b) by 195 days.

(21) Appl. No.: 18/522,485

(22) Filed: Nov. 29, 2023

(65) Prior Publication Data

US 2025/0171012 A1 May 29, 2025

(51) Int. Cl.
| | |
|---|---|
| *B60W 30/04* | (2006.01) |
| *B60W 10/08* | (2006.01) |
| *B60W 10/26* | (2006.01) |

(52) U.S. Cl.
CPC ............ *B60W 30/04* (2013.01); *B60W 10/08* (2013.01); *B60W 10/26* (2013.01); *B60W 2300/405* (2013.01); *B60W 2520/14* (2013.01); *B60W 2520/18* (2013.01); *B60W 2556/50* (2020.02)

(58) Field of Classification Search
CPC ...... B60W 30/04; B60W 10/08; B60W 10/26; B60W 2300/405; B60W 2520/14; B60W 2520/18; B60W 2556/50
USPC .......................................................... 701/22
See application file for complete search history.

(56) References Cited

U.S. PATENT DOCUMENTS

| | | | |
|---|---|---|---|
| 8,209,075 | B2 | 6/2012 | Senneff et al. |
| 8,589,049 | B2 | 11/2013 | Craig |
| 8,615,345 | B2 | 12/2013 | Macneille et al. |
| 8,659,404 | B2 | 2/2014 | Morgan et al. |
| 8,686,841 | B2 | 4/2014 | Macheca et al. |
| 8,825,369 | B2 | 9/2014 | Jin |
| 8,918,240 | B2 | 12/2014 | Manickaraj et al. |
| 8,954,255 | B1 | 2/2015 | Crawford |
| 8,996,234 | B1 | 3/2015 | Tamari et al. |
| 9,162,679 | B2 | 10/2015 | Sujan et al. |
| 9,303,759 | B2 | 4/2016 | Jeon et al. |
| 9,387,851 | B2 | 7/2016 | Klier et al. |
| 9,573,600 | B2 | 2/2017 | Gunaratne |
| 9,578,455 | B2 | 2/2017 | Rork et al. |
| 9,586,593 | B2 | 3/2017 | Takamatsu et al. |
| 9,613,466 | B1 | 4/2017 | Bullock |

(Continued)

FOREIGN PATENT DOCUMENTS

DE          102021212534 A1 *  5/2023  .......... B60W 30/045

*Primary Examiner* — Abby J Flynn
*Assistant Examiner* — Leah N Miller
(74) *Attorney, Agent, or Firm* — BainwoodHuang

(57) ABSTRACT

A technique is directed to controlling a vehicle. The technique involves setting a set of motion control parameters which controls motion of the vehicle to a set of initial values. The technique further involves receiving a set of motion signals from a set of sensors, the set of motion signals indicating a set of current motion characteristics of the vehicle. The technique further involves, based on the set of motion signals, changing at least one motion control parameter of the set of motion control parameters which controls motion of the vehicle from an initial value to an updated value which is different from the initial value.

20 Claims, 6 Drawing Sheets

(56) References Cited

U.S. PATENT DOCUMENTS

| | | | |
|---|---|---|---|
| 9,630,494 | B1 | 4/2017 | Glauber |
| 9,630,627 | B2 | 4/2017 | Prakah-Asante et al. |
| 9,744,974 | B2 | 8/2017 | Rose et al. |
| 9,776,563 | B1 | 10/2017 | Be et al. |
| 10,066,353 | B2 | 9/2018 | Kadaba |
| 10,072,388 | B2 | 9/2018 | Kadaba |
| 10,099,706 | B2 | 10/2018 | Hunt |
| 10,370,012 | B2 | 8/2019 | Brooks et al. |
| 10,410,516 | B1 | 9/2019 | Andersson et al. |
| 10,555,113 | B2 | 2/2020 | Weston et al. |
| 10,787,174 | B2 | 9/2020 | Sata |
| 10,796,573 | B2 | 10/2020 | Shah et al. |
| 10,880,679 | B2 | 12/2020 | Treman et al. |
| 11,034,345 | B2 | 6/2021 | Correia et al. |
| 11,072,329 | B2 | 7/2021 | Maleki et al. |
| 11,131,553 | B1 | 9/2021 | Lyle et al. |
| 11,148,680 | B2 | 10/2021 | Sikorski |
| 11,186,293 | B2 | 11/2021 | Gardner et al. |
| 11,192,548 | B2 | 12/2021 | Magolan et al. |
| 11,453,380 | B2 | 9/2022 | Lee |
| 11,453,393 | B2 | 9/2022 | Wienecke et al. |
| 11,472,417 | B2 | 10/2022 | Bucht et al. |
| 11,485,429 | B2 | 11/2022 | Yen et al. |
| 11,516,620 | B2 | 11/2022 | Ong et al. |
| 11,546,723 | B2 | 1/2023 | Makkiya et al. |
| 11,560,185 | B2 | 1/2023 | Kelly et al. |
| 11,752,882 | B1 * | 9/2023 | Wittenschlaeger .......................... B60L 15/2009 701/22 |
| 2004/0030474 | A1 * | 2/2004 | Samuel .............. B60G 17/0185 701/31.4 |
| 2017/0305416 | A1 * | 10/2017 | Yamakado ................ B60T 7/12 |
| 2019/0193840 | A1 * | 6/2019 | Burtt ...................... B64C 17/06 |
| 2020/0216085 | A1 | 7/2020 | Bobier-Tiu et al. |
| 2021/0061279 | A1 | 3/2021 | Nagata et al. |
| 2021/0086709 | A1 | 3/2021 | Islam |
| 2021/0284171 | A1 * | 9/2021 | Birkland ............ B60W 30/143 |
| 2021/0293573 | A1 | 9/2021 | Sofman et al. |
| 2022/0306119 | A1 | 9/2022 | Weston et al. |
| 2022/0332317 | A1 | 10/2022 | Lewandowski et al. |
| 2022/0371591 | A1 | 11/2022 | Craig et al. |
| 2022/0388517 | A1 | 12/2022 | Yokoyama et al. |

* cited by examiner

342

344
346
348
· · ·

Motor
Control
Circuitry
314

340

318

360

Controller 316

330

Set of
Sensors
312

CONTROLLING VEHICLES BASED ON CURRENT MOTION CHARACTERISTICS

BACKGROUND

A conventional electric golf cart includes a motor controller and an electric motor which is controlled by the motor controller. The electric motor mechanically connects to the golf cart's drive wheels through the drivetrain. To drive the electric motor and thus move the golf cart, the motor controller provides signals to operate the electric motor in response to sensed depression of the accelerator pedal.

Along these lines, as the operator of the golf cart further depresses the accelerator pedal, the motor controller is programmed to increase the speed of the electric motor and thus increase the speed of the golf cart. However, the motor controller is also programmed to restrict the golf cart from going over an overall top golf cart speed (e.g., 18 mph) as a safety measure. Accordingly, if the operator of the golf cart fully depresses the accelerator pedal, the electric motor of the golf cart may move the golf cart forward but no faster than the overall top golf cart speed.

SUMMARY

It should be understood that there are deficiencies to the above-described conventional approach which simply restricts a golf cart from going over an overall top golf cart speed as a safety measure. Along these lines, the overall top golf cart speed can still create uncomfortable sensations for the golf cart's occupants during certain situations such as cornering, swaying, other events, etc. In a severe case such as a rapid sharp turn, the golf cart may even become unsafe and create an undesirable incident.

One possible way to address these situations is to program the motor controller with a lower overall top golf cart speed (e.g., use a top golf cart speed of 12 mph rather than 18 mph in all situations). Unfortunately, there is a significant tradeoff to reducing the top golf cart speed in all situations. In particular, with a lower overall top golf cart speed, it will now take longer to traverse distances even when the golf cart is riding on sturdier flat terrain on which it is still safe to travel at a higher speed.

Improved techniques are directed to controlling a vehicle based on one or more current motion characteristics of the vehicle (e.g., angular velocity about a vertical axis, angular velocity about a longitudinal axis, combinations thereof, etc.). Along these lines, specialized circuitry may update a set of motion control parameters which controls vehicle motion. Example motion control parameters include the vehicle's speed limit, acceleration rate, deceleration rate, and the like. A suitable vehicle is an electric golf cart or other type of electric utility vehicle, and the currently selected values of such motion control parameters may be enforced by the vehicle's motor controller. Moreover, in some arrangements, the current motion characteristics of the vehicle are sensed by one or more inertial measurement units (IMUs) on board the vehicle (e.g., within the vehicle's motor controller, within a global position system device, within a standalone device, etc.). By changing the value of one or more motion control parameters based on one or more current motion characteristics, the vehicle may enjoy less restrictive motion control in certain situations for convenience (e.g., when traveling straight) and more conservative motion control in other situations for safety (e.g., when making a sharp turn or other cornering maneuver).

One embodiment is directed to a method of controlling a utility vehicle. The method includes setting a set of motion control parameters which controls motion of the utility vehicle to a set of initial values. The method further includes receiving a set of motion signals from a set of sensors, the set of motion signals indicating a set of current motion characteristics of the utility vehicle. The method further includes, based on the set of motion signals, changing at least one motion control parameter of the set of motion control parameters which controls motion of the utility vehicle from an initial value to an updated value which is different from the initial value.

Another embodiment is directed to electronic circuitry to control a utility vehicle. The electronic circuitry includes a set of sensors, motor control circuitry constructed and arranged to operate an electric motor for vehicle propulsion, and a controller coupled with the set of sensors and the motor control circuitry. The controller is constructed and arranged to perform a method of:

(A) setting a set of motion control parameters which the motor control circuitry uses to control motion of the utility vehicle to a set of initial values, (B) receiving a set of motion signals from the set of sensors, the set of motion signals indicating a set of current motion characteristics of the utility vehicle, and (C) based on the set of motion signals, changing at least one motion control parameter of the set of motion control parameters which the motor control circuitry uses to control motion of the utility vehicle from an initial value to an updated value which is different from the initial value.

Yet another embodiment is directed to a utility vehicle which includes a battery management system (BMS) having a lithium battery, a utility vehicle propulsion system constructed and arranged to provide utility vehicle propulsion using electric power from the lithium battery, and electronic circuitry coupled with the BMS and the utility vehicle propulsion system. The electronic circuitry is constructed and arranged to perform a method of:

(A) setting a set of motion control parameters which is used to control motion of the utility vehicle to a set of initial values, (B) receiving a set of motion signals from a set of sensors, the set of motion signals indicating a set of current motion characteristics of the utility vehicle, and (C) based on the set of motion signals, changing at least one motion control parameter of the set of motion control parameters which is used to control motion of the utility vehicle from an initial value to an updated value which is different from the initial value.

In some arrangements, the set of current motion characteristics indicated by the set of motion signals includes a set of angular speed metrics. Additionally, changing the at least one motion control parameter includes performing an adjustment operation that adjusts a particular motion control parameter of the set of motion control parameters based on the set of angular speed metrics.

In some arrangements, performing the adjustment operation includes:

(i) comparing a particular angular speed metric to a predefined threshold, and (ii) lowering the particular motion control parameter from a first value to a second value in response to the particular angular speed metric exceeding the predefined threshold.

In some arrangements, the set of angular speed metrics includes a first angular speed metric for utility vehicle angular speed about a vertical axis of the utility vehicle and a second angular speed metric for utility vehicle angular speed about a longitudinal axis of the utility vehicle. Additionally, performing the adjustment operation further includes, prior to comparing the particular angular speed metric to the predefined threshold, generating the particular angular speed metric based on at least one of the first angular speed metric and the second angular speed metric.

In some arrangements, the first angular speed metric is a turning rate metric for a turning rate of the utility vehicle. Additionally, the second angular speed metric is a roll rate metric for a roll rate of the utility vehicle. Furthermore, generating the particular angular speed metric includes deriving, as the particular angular speed metric, an angular intensity result from the turning rate metric and the roll rate metric.

In some arrangements, the utility vehicle includes a mapping table having entries which map different angular intensity results to respective values for the particular motion control parameter. Additionally, lowering the particular motion control parameter from the first value to the second value includes performing a mapping table lookup operation which identifies a particular entry of the mapping table based on the derived angular intensity result, and reads the second value from the particular entry. Alternatively, the second value is generated algorithmically using a mathematical function.

In some arrangements, prior to deriving the angular intensity result, the roll rate metric has an initial roll rate. Additionally, generating the particular angular speed metric further includes, prior to deriving the angular intensity result, modifying the roll rate metric from the initial roll rate to a zero roll rate in response to the initial roll rate being lower than a predefined roll rate threshold.

In some arrangements, prior to deriving the angular intensity result, the roll rate metric has an initial roll rate. Additionally, generating the particular angular speed metric further includes, prior to deriving the angular intensity result, modifying the roll rate metric from the initial roll rate to a scaled roll rate which is the initial roll rate scaled by a predefined scaling factor.

In some arrangements, the turning rate metric has an unscaled turning rate. Additionally, deriving the angular intensity result from the turning rate metric and the roll rate metric includes summing the unscaled turning rate of the turning rate metric with the scaled roll rate of the roll rate metric to form the angular intensity result.

In some arrangements, at least a portion of the set of sensors resides in an IMU within a motor controller of the utility vehicle. Additionally, performing the adjustment operation further includes, prior to comparing the particular angular speed metric to the predefined threshold, generating the particular angular speed metric from at least one IMU reading from the IMU within the motor controller.

In some arrangements, at least a portion of the set of sensors resides in an IMU within a global position system (GPS) device coupled with a motor controller of the utility vehicle, the GPS device being constructed and arranged to provide GPS device access to the utility vehicle. Additionally, performing the adjustment operation further includes, prior to comparing the particular angular speed metric to the predefined threshold, generating the particular angular speed metric from at least one IMU reading from the IMU within the GPS device.

In some arrangements, the utility vehicle is equipped with at least a GPS device coupled with a motor controller, the GPS device being constructed and arranged to provide GPS device access to the utility vehicle, and the motor controller being constructed and arranged to control operation of an electric traction motor of the utility vehicle. Additionally, a portion of the set of sensors resides within an IMU which is external to both the GPS device and the motor controller. Furthermore, performing the adjustment operation further includes, prior to comparing the particular angular speed metric to the predefined threshold, generating the particular angular speed metric from at least one IMU reading from the IMU which is external to both the GPS device and the motor controller.

In some arrangements, lowering the particular motion control parameter from the first value to the second value includes reducing a maximum speed that a motor controller imposes on the utility vehicle from a first speed to a second speed that is slower than the first speed.

In some arrangements, lowering the particular motion control parameter from the first value to the second value includes reducing a maximum acceleration rate that a motor controller imposes on the utility vehicle from a first acceleration rate to a second acceleration rate that is lower than the first acceleration rate.

In some arrangements, lowering the particular motion control parameter from the first value to the second value includes reducing a maximum deceleration rate that a motor controller imposes on the utility vehicle from a first deceleration rate to a second deceleration rate that is lower than the first deceleration rate.

In some arrangements, changing the at least one motion control parameter of the set of motion control parameters includes:

(i) changing a maximum speed parameter that a motor controller uses to control speed of the utility vehicle from a first speed to a second speed that is slower than the first speed, and (ii) reducing a maximum acceleration rate that the motor controller uses to control acceleration of the utility vehicle from a first acceleration rate to a second acceleration rate that is lower than the first acceleration rate.

Other embodiments are directed to systems, subsystems, apparatus, assemblies, and so on. Some embodiments are directed to various methods, componentry, platforms, crafts, etc. which are involved in controlling motion in which the value of at least one motion control parameter is changed based on one or more current motion characteristics.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

FIG. 3 is another block diagram of a portion of the example vehicle in accordance with certain embodiments.

DETAILED DESCRIPTION

An improved technique is directed to controlling a vehicle based on one or more current motion characteristics of the vehicle (e.g., angular velocity about a vertical axis, angular velocity about a longitudinal axis, combinations thereof, etc.). Along these lines, specialized circuitry may update a set of motion control parameter values which controls vehicle motion. Example motion control parameters include the vehicle's speed limit, acceleration rate, deceleration rate, and the like. A suitable vehicle is an electric golf cart or other type of electric utility vehicle, and the currently selected values of such motion control parameters may be enforced by the vehicle's motor controller. Moreover, in some arrangements, the current motion characteristics of the vehicle are sensed by one or more inertial measurement units (IMUs) on board the vehicle (e.g., within the vehicle's motor controller, within a global position system device, within a standalone device, etc.). By changing the value of one or more motion control parameters based on one or more current motion characteristics, the vehicle may enjoy less restrictive motion control in certain situations for convenience (e.g., when traveling straight) and more conservative motion control in other situations for safety (e.g., when making a sharp turn or other cornering maneuver).

The various individual features of the particular arrangements, configurations, and embodiments disclosed herein can be combined in any desired manner that makes technological sense. Additionally, such features are hereby combined in this manner to form all possible combinations, variants and permutations except to the extent that such combinations, variants and/or permutations have been expressly excluded or are impractical. Support for such combinations, variants and permutations is considered to exist in this document.

Figure 1:
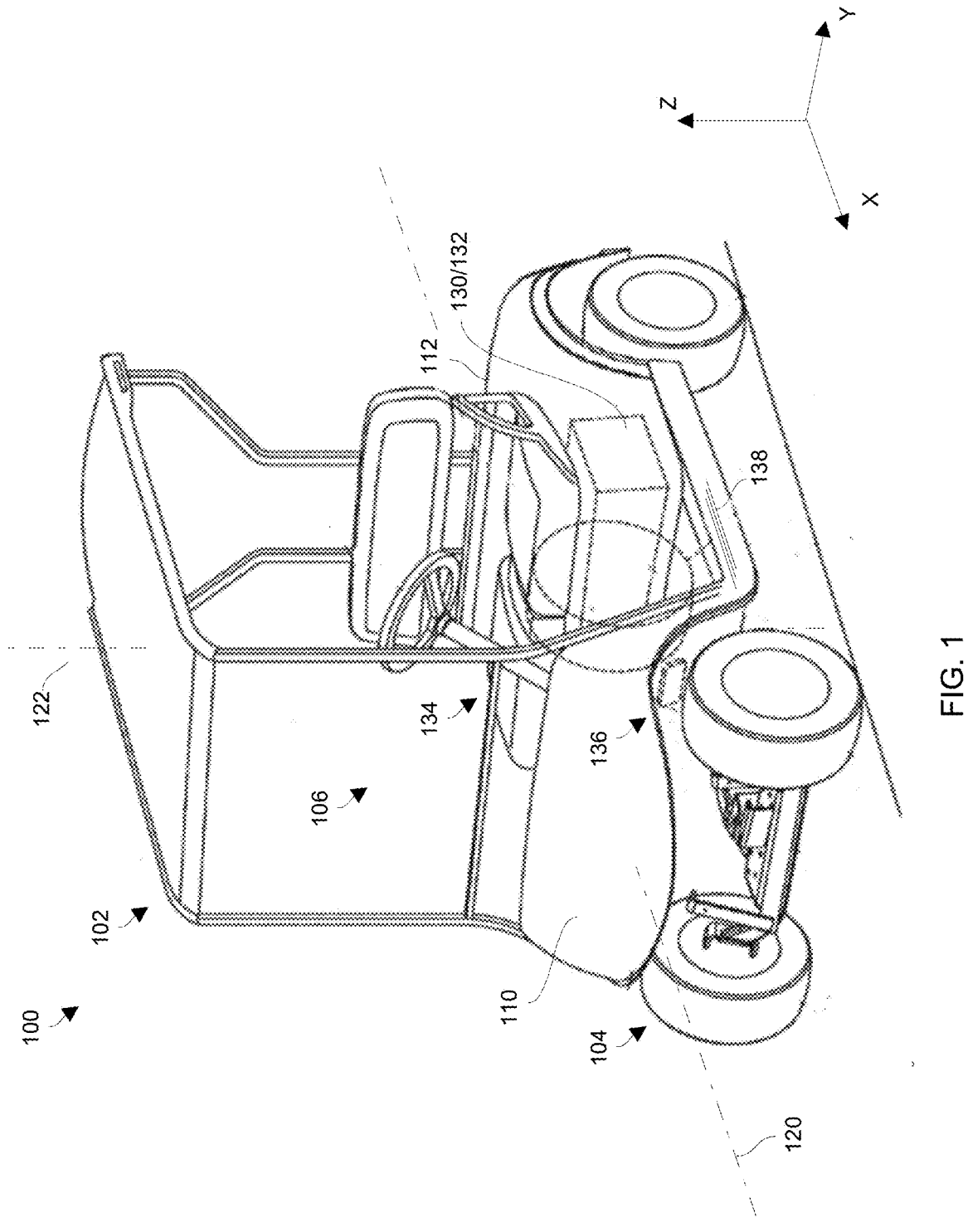
FIG. 1 is a diagram of an example vehicle which provides grade-based motion limiting in accordance with certain embodiments.

FIG. 1 shows an example utility vehicle 100 which provides motion control based on one or more current vehicle motion characteristics in accordance with certain embodiments. The utility vehicle 100 includes a utility vehicle body 102 (e.g., a chassis, a frame, etc.), a set of engagement members 104 (e.g., a set of tires), and a motion control system 106. It should be understood that the utility vehicle 100 has the form factor of a golf car by way of example only and that other utility vehicle form factors are suitable for use as well such as those of personnel and/or cargo transport vehicles, food and beverage vehicles, hospitality vehicles, all-terrain vehicles (ATVs), utility task vehicles (UTVs), tracked vehicles, larger specialized equipment and/or application vehicles, motorcycles, scooters, skimobiles, as well as other lightweight and/or special purpose vehicles.

The utility vehicle body 102 defines a vehicle front 110 and a vehicle back 112. Accordingly, when the utility vehicle 100 moves forward in the direction of the utility vehicle's longitudinal axis 120, the utility vehicle 100 is considered to move in a front-to-back direction (e.g., see the positive X-direction in FIG. 1). It should be understood that the utility vehicle 100 still may be considered moving forward even if the operator is also turning the steering wheel so that the utility vehicle 100 is additionally moving about the utility vehicle's vertical axis 122 (e.g., see the Z-axis in FIG. 1).

The set of engagement members 104 is constructed and arranged to interact with the environment to move the utility vehicle 100. It should be understood that various types of engagement members 104 are suitable for use (e.g., tires/wheels, tracks, rails, combinations thereof, etc.) depending on the type of environment or terrain (e.g., a road, dirt, brush, snow, ice, marsh, etc.).

The motion control system 106 is constructed and arranged to control vehicle movement such as drive provided by the set of engagement members 104, speed control, braking, and so on thus enabling the utility vehicle 100 to effectively maneuver and perform useful work. The motion control system 106 may include, among other things, a motor system 130, a battery management system 132, and additional components 134 such as a set of user controls 136 (e.g., foot pedals, transmission control, a keyed switch, a maintenance switch, additional levers/knobs/etc.), cabling 138, and so on.

It should be understood that certain components of the motor control system 106 (or portions thereof) may be disposed within a set of compartments (in one or more compartments) under a set of seats (under one or more seats) of the utility vehicle 100. For example, a compartment underneath a seat of the utility vehicle 100 may house one or more rechargeable batteries, control circuitry, cabling, controls, etc. for ease of access/serviceability, to protect passengers, for protection against damage, for security, and so on. Other locations are suitable for use as well such as under a hood, under a rear bed, etc.

It should be further understood that the motion control system 106 includes other apparatus/components as well. Along these lines, the motion control system 106 further includes a drivetrain (e.g., a set of gears, linkage, differential, etc.) that connects the motor system 130 to the set of engagement members 104 (e.g., two drive wheels and two non-drive wheels, four drive wheels, tracks, etc.), a steering wheel (or column), a steering gear set that connects the steering wheel to certain engagement members 104, a set of brakes, other controls and sensors, and so on.

As will be explained in further detail shortly and in accordance with certain embodiments, the utility vehicle 100 includes an electric traction motor which runs on electric power from a rechargeable battery for propulsion, and which may be equipped with a regenerative braking control feature which recharges the rechargeable battery. Moreover, the utility vehicle 100 is configured to operate in accordance with a set of maximum motion limits (e.g., to improve the user experience, to protect equipment of the utility vehicle 100, to protect passengers and/or bystanders, combinations thereof, etc.). Such a set of maximum motion limits or constraints (e.g., a maximum speed, a maximum acceleration rate, a maximum deceleration rate, combinations thereof, etc.) are the highest motion limits permitted/allowed by the motion control system 106 during operation of the utility vehicle 100.

During operation, the utility vehicle 100 is configured to automatically select, in real-time, particular maximum motion limits based on a set of current vehicle motion characteristics of the utility vehicle 100. Along these lines, if the utility vehicle 100 is moving straight (e.g., there is little or no angular velocity), the utility vehicle 100 may select and use an initial (or default) set of maximum motion limits. However, if the utility vehicle 100 is turning under certain conditions (e.g., based on a sensed set of angular velocities), the utility vehicle 100 may select and use one or more lower maximum motion limits. Additionally, if the utility vehicle 100 is turning more severely, the utility vehicle 100 may select and use one or more even lower maximum motion limits, and so on. Such operation improves passenger experience and ensures that the utility vehicle 100 maneuvers in a safe and controlled manner.

In some arrangements in which the utility vehicle 100 is capable of performing regenerative braking, the utility vehicle 100 may impose different deceleration rates depending on how intensely the utility vehicle 100 is turning. Further details will now be provided with reference to FIGS. 2 and 3.

Figure 2:
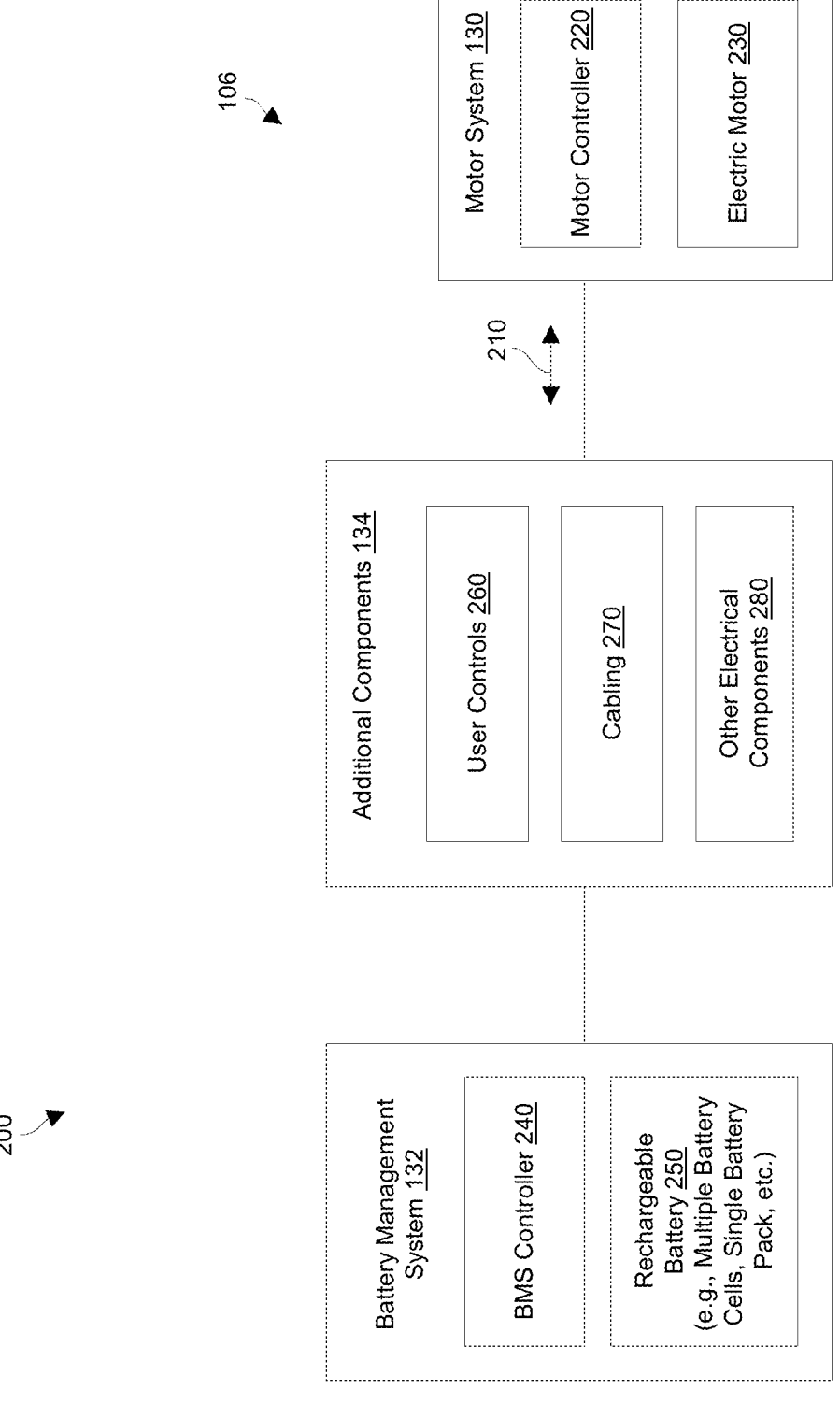
FIG. 2 is a block diagram of a portion of the example vehicle in accordance with certain embodiments.
Figure 3:
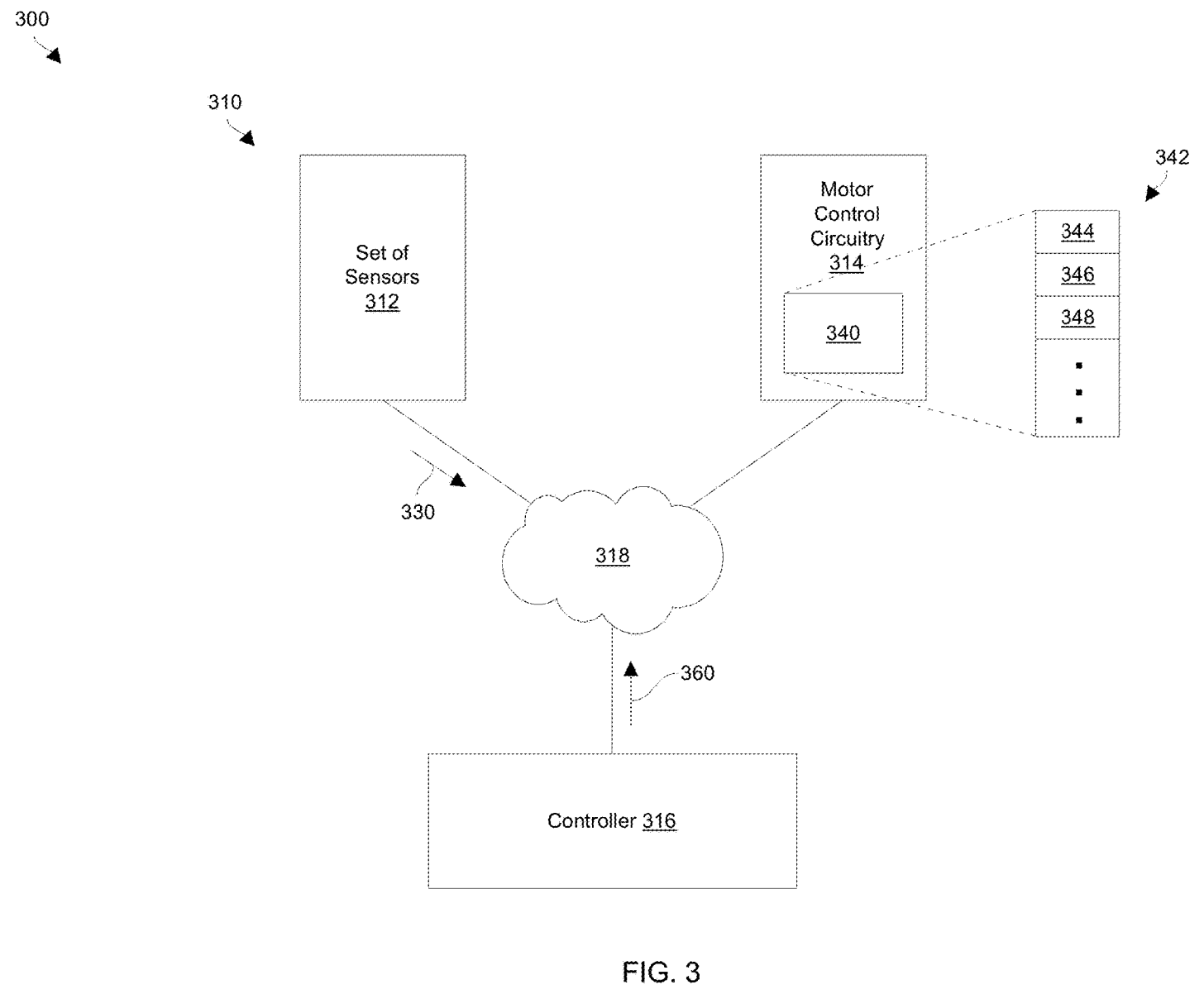

FIGS. 2 and 3 provide certain details regarding vehicle motion control based on one or more current vehicle motion characteristics in accordance with certain embodiments. FIG. 2 is a view 200 of at least a portion of the motion control system 106 of the utility vehicle 100 (also see FIG. 1) in accordance with certain embodiments. FIG. 3 is a view 300 of certain components of the motion control system 106 which are involved in vehicle motion control based on one or more current vehicle motion characteristics in accordance with certain embodiments.

As shown in the view 200 of FIG. 2, the motor system 130, the battery management system (BMS) 132, and the additional components 134 are coupled with each other (e.g., via power buses, communications buses, etc.) and exchange electrical signals 210 (e.g., power signals, control/status signals, sensor signals, and so on). The motor system 130 includes a motor controller 220 and an electric traction motor 230 (or simply electric motor 230) coupled with the motor controller 220. The BMS 132 includes a BMS controller 240 and a rechargeable battery 250 coupled with the BMS controller 240. The additional components 134 refer to various componentry coupled with the motor system 130 and/or the battery management system 132 such as user controls 260 (e.g., switches, pedals, etc.), cabling 270 (e.g., power cables, communications buses, etc.), and other electrical components 280 (e.g., a charging receptacle and/or an onboard charger, lights, a global positioning system device, specialized equipment, other loads, etc.). In some arrangements, various components of the motion control system 106 communicate through a controller area network (CAN) bus via electronic CAN messages in accordance with the CAN protocol.

The motor controller 220 of the motor system 130 is constructed and arranged to control delivery of stored electric energy from the BMS 132 to the electric motor 230 which ultimately operates at least some of the engagement members 124 to move the utility vehicle 100. Additionally, the motor controller 220 may operate the electric motor 230 to provide regenerative braking in which the electric motor 230 converts kinetic energy of the moving utility vehicle 100 into electrical energy to recharge the rechargeable battery 250 (e.g., during braking, while the utility vehicle 20 coasts downhill, during accelerator pedal release, etc.). To this end, the motor controller 220 and/or the additional components 134 may be provisioned with a battery system interface that enables the motor controller 220 to robustly and reliably connect with and communicate with the BMS 132.

In accordance with certain embodiments, the electric motor 230 is a three-phase induction motor which includes a stator having three-phase windings, and a rotor connected to one or more engagement members 104 (also see FIG. 1). The motor controller 220 operates the electric motor 230 by providing a three-phase AC current through the stator to produce a rotating magnetic field which rotates the rotor either in the forward or reverse direction. The motor controller 220 controls the rate of rotation and strength by controlling the frequency and amplitude of the AC current.

The BMS controller 240 of the BMS 132 is constructed and arranged to control electrical access to the rechargeable battery 250. Additionally, the BMS 132 may respond to various events such as sleep events (e.g., timeouts) to prevent excessive discharging of the rechargeable battery 250, overvoltage events to prevent creating an overvoltage situation, etc, thus safeguarding the rechargeable battery 250. The BMS controller 240 may respond to other events as well such as wakeup events (e.g., actuation of the user controls 136, etc.), charging events, faults, and so on to properly and safely control charging and discharging of the rechargeable battery 250.

It should be understood that a variety of battery types and form factors are suitable for the rechargeable battery 250. For example, the rechargeable battery 250 may be a lithium battery which includes multiple lithium battery cells, a single battery pack, combinations thereof, and so on. As another example, the rechargeable battery 250 may utilize one or more lead acid batteries in place of, or in combination with, the lithium battery, and so on. In some multi cell arrangements, the BMS controller 240 monitors various individual metrics from each cell (e.g., state of charge, voltage, temperature, etc.) and is constructed and arranged to provide such individual metrics and/or aggregated metrics (e.g., the highest voltage among the cells, the lowest voltage among the cells, the highest temperature among the cells, the lowest temperature among the cells, averaged and/or median values, etc.) to the motor system 130 (e.g., periodically, in response to commands, combinations thereof, etc.).

In accordance with some embodiments, the BMS controller 240 includes a BMS contactor and a BMS control circuit that closes the BMS contactor in order to connect the rechargeable battery 250 to the motor system 130. If the BMS control circuit detects certain events and/or faults, the BMS control circuit opens the BMS contactor to disconnect the rechargeable battery 250 from the motor system 130. For example, if there is too much regenerative braking charge supplied by the motor system 130 while the rechargeable battery 250 is almost fully charged, the BMS control circuit may open the BMS contactor to avoid an overvoltage situation. Such operation safeguards the rechargeable battery 250.

It should be understood that one or more portions of the BMS controller 240 may reside along with the rechargeable battery 250 within a standalone battery package or module. For example, certain sensors and fault detection circuitry may reside in such a battery package.

Furthermore, one or more portions of the BMS controller 240 may reside outside such a battery package or module. For example, a contactor and/or sleep logic may be external to such a battery package.

The user controls 260 of the additional components 134 are constructed and arranged to enable an operator to control operation of the utility vehicle 100 (FIG. 1). Along these lines, the user controls 260 may include an accelerator pedal to enable an operator to control the speed, etc. of the electric motor 230 and thus the speed, etc. of the utility vehicle 100. Additionally, the user controls 260 may include a brake pedal to enable the operator to provide braking (e.g., regenerative braking, deployment of a mechanical service brake if available, engagement of an emergency or parking brake if fully depressed, etc.). Furthermore, the user controls 260 may include a transmission switch to control whether the motor system 130 moves the utility vehicle 100 in the forward (or front-to-back) direction or reverse (or back-to-front) direction in response to pedal depression. Other user controls 260 include a keyed switch, a tow switch, and so on.

In some arrangements, speed control which is based on the amount of accelerator pedal deflection (or depression)

involves Hall sensing or inductive throttles. However, other mechanisms are suitable for use as well such as measuring accelerator pedal deflection using a potentiometer or similar device, accessing a mapping table which maps (or converts) a signal from the potentiometer to particular speeds, etc.

The other electrical components 280 refers to other systems, subsystems, etc. of the utility vehicle 100. For example, the utility vehicle 100 may be provisioned with a GPS device (or circuit) to identify a current GPS location of the utility vehicle 100. Such a GPS device may enable the utility vehicle 100 to impose geofencing-based vehicle control, report vehicle location to a central server, access other services (e.g., weather forecasts, golf course information/ distances, etc.).

During operation, the operator may use the utility vehicle 100 to perform useful work. For example, in the context of a golf cart, the operator may drive the utility vehicle 100 over terrain while utility vehicle 100 carries one or more sets of golf clubs to maneuver among holes of a golf course. Such terrain may include cart paths, fairways, etc. which enable driving the utility vehicle 100 in a generally straight path. Such terrain may further include other cart paths, fairways, etc. which require driving the utility vehicle 100 while turning.

As mentioned earlier, other uses exist for the utility vehicle 100 (e.g., personnel and/or cargo transport, catering, emergency applications, off-road applications, specialized applications, etc.). For such other uses, the environment may be similar to and/or different from golf course terrain.

During utility vehicle operation, the motor controller 220 of the utility vehicle 100 imposes motion control over the electric motor 230 in accordance with various maximum motion limits (e.g., a speed limit, a maximum acceleration rate, a maximum deceleration rate, etc.). The values of these maximum motion limits (or constraints) may be changed over time.

Along these lines, at startup, the maximum motion limits are set to initial values. Such initial values may be stored within the motor controller 220 persistently, loaded into the motor controller 220 at startup, commanded to the motor controller 220 in an ongoing manner, etc. For example, the speed limit imposed by the motor controller 220 in the forward direction may be 18 mph (miles per hour), the maximum acceleration rate may be 50 deg/sec (degrees per second), and so on.

After the maximum motion limits are set to initial values, specialized circuitry may change the maximum motion limits based on current vehicle motion characteristics. Along these lines, the specialized circuitry monitors the current vehicle motion characteristics in an ongoing manner, and may adjust one or more maximum motion limits when the current vehicle motion characteristics satisfy certain criteria. For example, if the current vehicle motion characteristics indicate a severe turning event, the specialized circuitry may reduce the speed limit imposed by the motor controller 220 from 18 mph to 15 mph and/or the maximum acceleration rate from 50 deg/sec to 30 deg/sec. Of course, other values and/or units are suitable for use as well (e.g., seconds, meters/second, G's or g-force, and so on).

In particular, at some point during operation such as when the utility vehicle 100 enters a turn (or intense sway), the specialized circuitry ascertains the severity of the turn. If the specialized circuitry determines that the severity of the turn does not satisfy a predefined set of criteria, the specialized circuitry does not adjust any of the initial values of the maximum motion limits. However, if the specialized circuitry determines that the severity of the turn satisfies the predefined set of criteria, the specialized circuitry adjusts at least one initial value to a new value as will now be described in further detail.

As shown in the view 300 of FIG. 3, certain electronic circuitry 310 of the motor system 130 is involved in motion control based on one or more current vehicle motion characteristics. The electronic circuitry 310 includes a set of sensors 312, motor control circuitry 314, a controller 316, and a communications medium 318.

The set of sensors 312 is constructed and arranged to sense various current motion attributes of the utility vehicle 100. Example motion attributes that may be sensed and/or derived from other sensed motion attributes include roll about the utility vehicle's longitudinal axis 120, the utility vehicle's angular velocity about the utility vehicle's vertical axis 122, combinations thereof, etc. (also see FIG. 1). Suitable sensor components for the set of sensors 312 include accelerometers, gyroscopes, and the like.

The set of sensors 312 measures and outputs a set of sensor signals 330 indicating certain motion-related attributes such as linear acceleration, pitch, roll, vibration, combinations thereof, etc. in one or more directions (e.g., one, two, or three directions).

In some embodiments, one or more sensors 312 are built-in to the motor controller 220 (also see FIG. 2). In some embodiments, one or more sensors 312 are external to the motor controller 220 (e.g., one or more discrete components). In some embodiments, the set of sensors 312 includes one or more components forming part of the motor controller 220, and one or more components external to the motor controller 220 (e.g., a GPS device, standalone sensors, combinations thereof, etc.).

The motor control circuitry 314 is constructed and arranged to control operation of the electric motor 230 (also see FIG. 2). Along these lines, the motor control circuitry 314, which is part of the motor controller 220 (FIG. 2), monitors various inputs such as accelerator pedal depression (e.g., angular displacement of the accelerator pedal), the current direction setting (e.g., forward, reverse, and neutral), brake pedal depression, and so on. In response to such inputs, the motor control circuitry 314 operates the electric motor 230 by providing various motion responses (e.g., speed, acceleration, deceleration, etc.).

Additionally, in some embodiments, the motor control circuitry 314 includes memory 340 (e.g., a bank of control/ status registers) which stores a set of operating parameters 342 such as a speed limit 344, a maximum acceleration rate 346, a maximum deceleration rate 348, and so on. The motor control circuitry 314 uses the set of operating parameters 342 as operating constraints and/or guidance and may control the rate of rotation of the electronic motor 230 in response thereto (e.g., via signal strength, based on timing, whether to perform regenerative braking, etc.) to smoothen vehicle behavior, provide safety, improve the user experience, etc. As will be explained in further detail shortly, one or more of the operating parameters 342 may be changed in real-time (e.g., set at startup, changed at time T0 during runtime, changed again at time T1 during runtime, and so on).

The controller 316 is constructed and arranged to provide a set of control signals 360 to the motor control circuitry 314. The set of control signals 360 determines how the motor control circuitry 314 operates the electric motor 230.

Along these lines, the controller 316 may receive the set of sensor signals 330 from the set of sensors 312 and perform operations to determine whether to change any values of the set of operating parameters 342 used by the motor control circuitry 314. For example, the controller 316 may initially direct the motor control circuitry 314 to use an initial (or default) set of values for the set of operating parameters 342. Then, based on various factors indicated by the set of sensor signals 330, the controller 316 may update one or more of the set of operating parameters 342 with new values. The controller 316 may continue this operation in an ongoing manner (e.g., while the utility vehicle 100 is driven by an operator) thus achieving real-time vehicle motion control based on current vehicle motion characteristics.

The communications medium 318 is constructed and arranged to connect the various components of the electronic circuitry 310 together to enable these components to exchange electronic signals (e.g., see the arrows 330 and 360). The communications media 318 is illustrated as a cloud to indicate that the communications media 318 is capable of having a variety of different topologies including backbone, hub-and-spoke, loop, irregular, combinations thereof, and so on. Along these lines, the communications media 318 may include copper-based data communications devices and cabling, fiber optic devices and cabling, wireless devices for wireless communications, combinations thereof, etc. Furthermore, the communications media 318 is capable of using one or more buses, cables, individual conductors, circuit board traces, communications interfaces, shared resources, combinations thereof, etc.

It should be understood that, initially, the set of operating parameters 342 may have been pre-loaded into the motor control circuitry 314 by the controller 316 (e.g., when the utility vehicle 100 is turned on). Alternatively, the motor control circuitry 314 may persistently store the set of operating parameters 342 and thus have access to the set of operating parameters 342 at the onset of operation.

Then, in an ongoing manner, the controller 316 receives the set of sensor signals 330 from the set of sensors 312 through the communications medium 318 and performs operations to determine whether to change any of the set of operating parameters 342 used by the motor control circuitry 314. If the controller 316 determines, based on the set of sensor signals 330, that the set of current physical attributes of the utility vehicle 100 fits a certain set of criteria, the controller 316 outputs the set of control signals 360 to the motor control circuitry 314 through the communications medium 318 to update one or more of the set of operating parameters 342.

Accordingly, the controller 316 adjusts a set of maximum motion limits in real time based on a set of current motion characteristics of the utility vehicle 100. The motor control circuitry 314 then imposes the adjusted set of maximum motion limits on the utility vehicle 100 while the utility vehicle 100 is being driven. Accordingly, such motion limiting adjustment is made by the electronic circuitry 310 automatically without requiring user intervention (e.g., the utility vehicle 100 may automatically slow down in a severe cornering event even if the operator does not let up on the accelerator pedal or even if the operator does not have time or appropriate coordination to properly react). Further details will now be provided with reference to FIG. 4.

Figure 4:
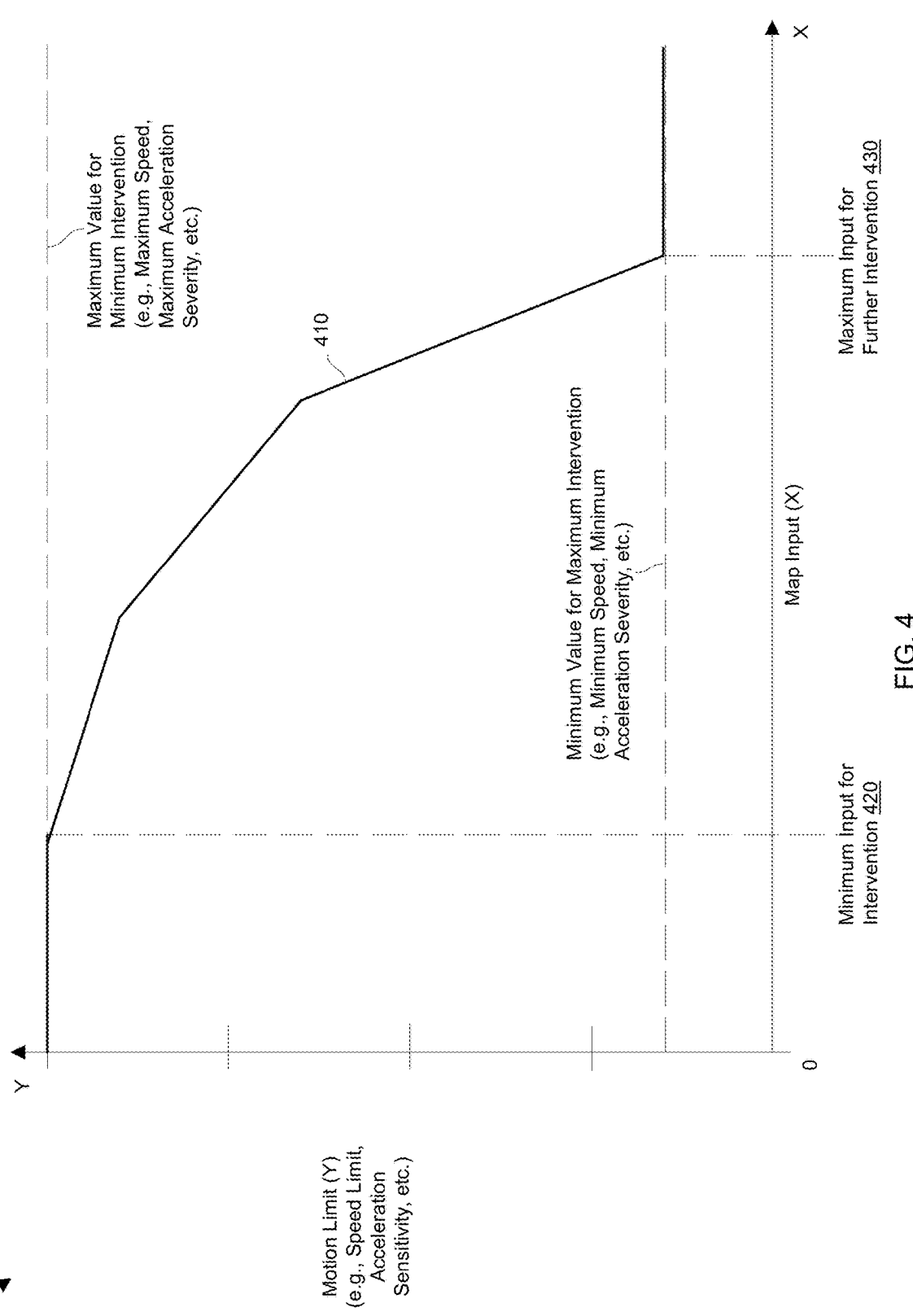
FIG. 4 is a chart of a motion limit curve in accordance with certain embodiments.

FIG. 4 shows a view 400 of an example motion limit map (or curve) 410 for the utility vehicle 100 in accordance with certain embodiments. Such a motion limit map 410 is suitable for mapping a map input (X), which is based on a set of current motion characteristics of the utility vehicle 100, to a motion limit (Y). The map input (X) is an indication of turning intensity (e.g., a measure of stability).

Suitable motion limits include maximum allowed speed, maximum acceleration rate, maximum deceleration rate, and the like.

The map input (X) of the motion limit map 410, as just mentioned, is an indication of utility vehicle stability and is based on sensed motion from the set of sensors 312 (also see FIG. 3). Along these lines, the map input (X) increases as the severity of certain types of utility vehicle movement increases, e.g., roll about the longitudinal axis 120, turning/cornering about the vertical axis 122, combinations thereof, etc. (also see FIG. 1).

The motion limit (Y) of the motion limit map 410 is a function of the map input (X). Along these lines, the motion limit (Y) decreases as the severity of the map input increases. In particular, the motion limit (Y) is capped while the map input (X) is below a certain minimum input 420 (i.e., minimum input before intervention). That is, the motion limit (Y) may remain unadjusted (e.g., at an initial or default value) until the map input (X) increases above a certain level.

If the map input (X) exceeds this minimum input 420, the motion limit (Y) decreases until the map input (X) reaches a certain maximum input 430 (i.e., maximum map input before further intervention). As shown in FIG. 4, the decrease in the motion limit (Y) may be gradual at lower map input values but decreases at a steeper rate at higher map input values.

If the map input (X) exceeds the maximum input 430, the motion limit map 410 relies on the utility vehicle 100 to employ one or more additional measures. For example, the utility vehicle 100 may disable the electric motor 230 (FIG. 2) and/or engage braking and thus bring the utility vehicle 100 to a full stop, may output an alert, may signal a central server, combinations thereof, etc.

For illustration purposes, suppose that the motion limit map 410 represents the response function for controlling the speed limit of the utility vehicle 100. Along these lines, as long as the map input (X) (which is an indication of vehicle stability) remains below the threshold 420, the speed limit of the utility vehicle 100 may remain at a maximum value (e.g., 18 mph).

However, if the map input (X) slightly exceeds the threshold 420, the motion limit map 410 indicates that the speed of the utility vehicle 100 is to be reduced. For example, the utility vehicle 100 may be slightly turning and, when such motion is sensed, the motion limit map 410 directs the speed limit to be reduced (e.g., from 18 mph to 16 mph).

It should be understood that, if the map input (X) exceeds the threshold 420 by a larger amount, the motion limit map 410 indicates that the speed of the utility vehicle 100 is to be reduced by a greater amount. For example, the utility vehicle 100 may be turning more severely and, when such motion is sensed, the motion limit map 410 directs the speed limit to be more aggressively reduced (e.g., to 14 mph), and so on.

Furthermore, if the map input (X) exceeds the threshold 420 by an extreme amount that exceeds the threshold 430, the motion limit map 410 indicates that the speed of the utility vehicle 100 is to be reduced by the maximum amount (e.g., 6 mph). Additionally, the utility vehicle 100 may perform other operations as mentioned above such as output a warning (e.g., flash an alert on a display, output an audio signal, combinations thereof, etc.), send an alert to a central station, and so on.

It should be understood that the utility vehicle 100 may utilize a similar motion limit map 410 for other motion limits. Such other motion limits include acceleration severity, deceleration severity, and so on.

It should be understood that the utility vehicle 100 may use alternatives to a mapping table of entries and a lookup process as described above. For example, in other arrangements, the utility vehicle 100 derives one or more speed metrics via a set of mathematical functions. Further details will now be provided with reference to FIG. 5.

Figure 5:
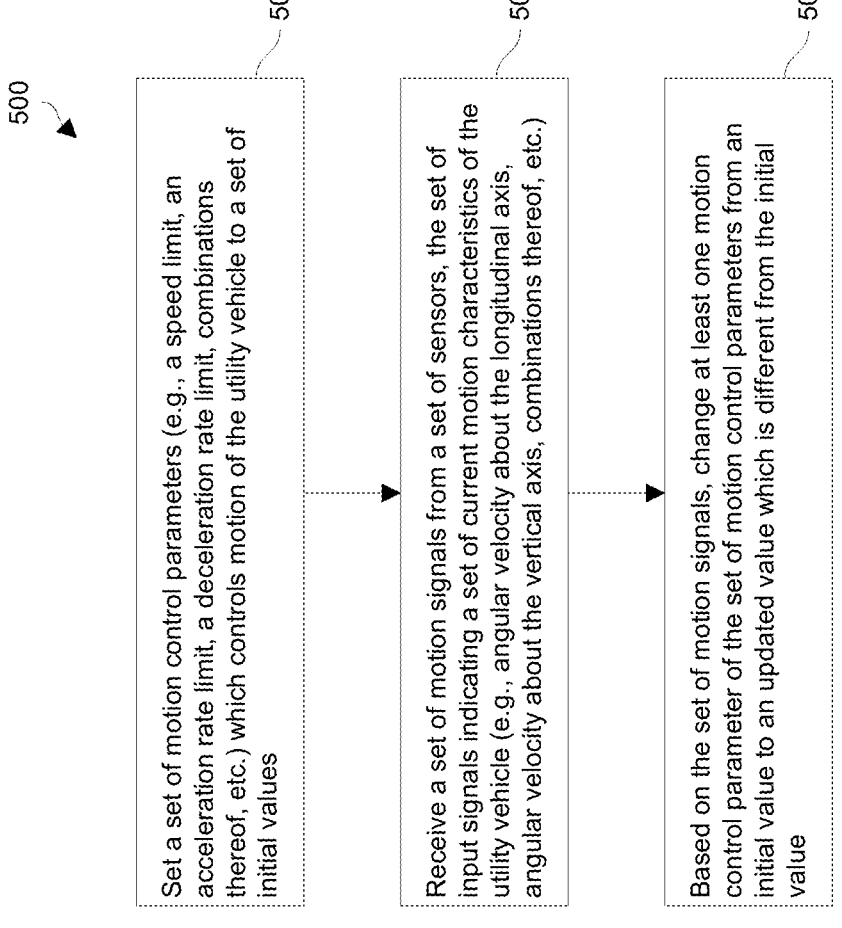
FIG. 5 is a flowchart of a procedure for grade-based motion control in accordance with certain embodiments.

FIG. 5 is a flowchart of a procedure 500 of controlling a utility vehicle (e.g., providing motion control) based on one or more current motion characteristics of the utility vehicle in accordance with certain embodiments. Such a procedure 500 may be performed by specialized circuitry of the utility vehicle such as by a motor controller, a BMS, an external device, other circuitry, combinations thereof, etc. (e.g., also see the controller 316 in FIG. 3).

At 502, the specialized circuitry sets a set of motion control parameters which controls motion of the utility vehicle to a set of initial values. For example, the specialized circuitry may impose a first speed limit, a first acceleration rate limit, and/or a first deceleration rate limit on the utility vehicle.

At 504, the specialized circuitry receives a set of motion signals from a set of sensors, the set of motion signals indicating a set of current motion characteristics of the utility vehicle. Example motion characteristics include the current angular velocity of the utility vehicle about the longitudinal axis and the current angular velocity of the utility vehicle about the vertical axis (also see FIG. 1).

At 506, the specialized circuitry changes, based on the set of motion signals, at least one motion control parameter of the set of motion control parameters which controls motion of the utility vehicle from an initial value to an updated value which is different from the initial value. For example, the specialized circuitry may reduce the maximum allowed speed, the acceleration rate limit, the deceleration rate limit, combinations thereof, etc.

It should be appreciated that some motor controllers may describe acceleration rates in seconds. Accordingly, a lower value means a higher severity. In this context, reducing a maximum acceleration rate that a motor controller imposes on the utility vehicle from a first acceleration rate to a second acceleration rate that is lower than the first acceleration rate means that the acceleration rate value is actually made higher (e.g., the motor controller may "reduce" the maximum acceleration rate by changing value of the acceleration rate from 8s to 12s).

It should be understood that the specialized circuitry continues to perform 504 and 506 in an ongoing manner. Accordingly, the values of the set of motion control parameters imposed by the utility vehicle may change over time based on various current motion characteristics of the utility vehicle. Further details will now be provided with reference to FIG. 6.

Figure 6:
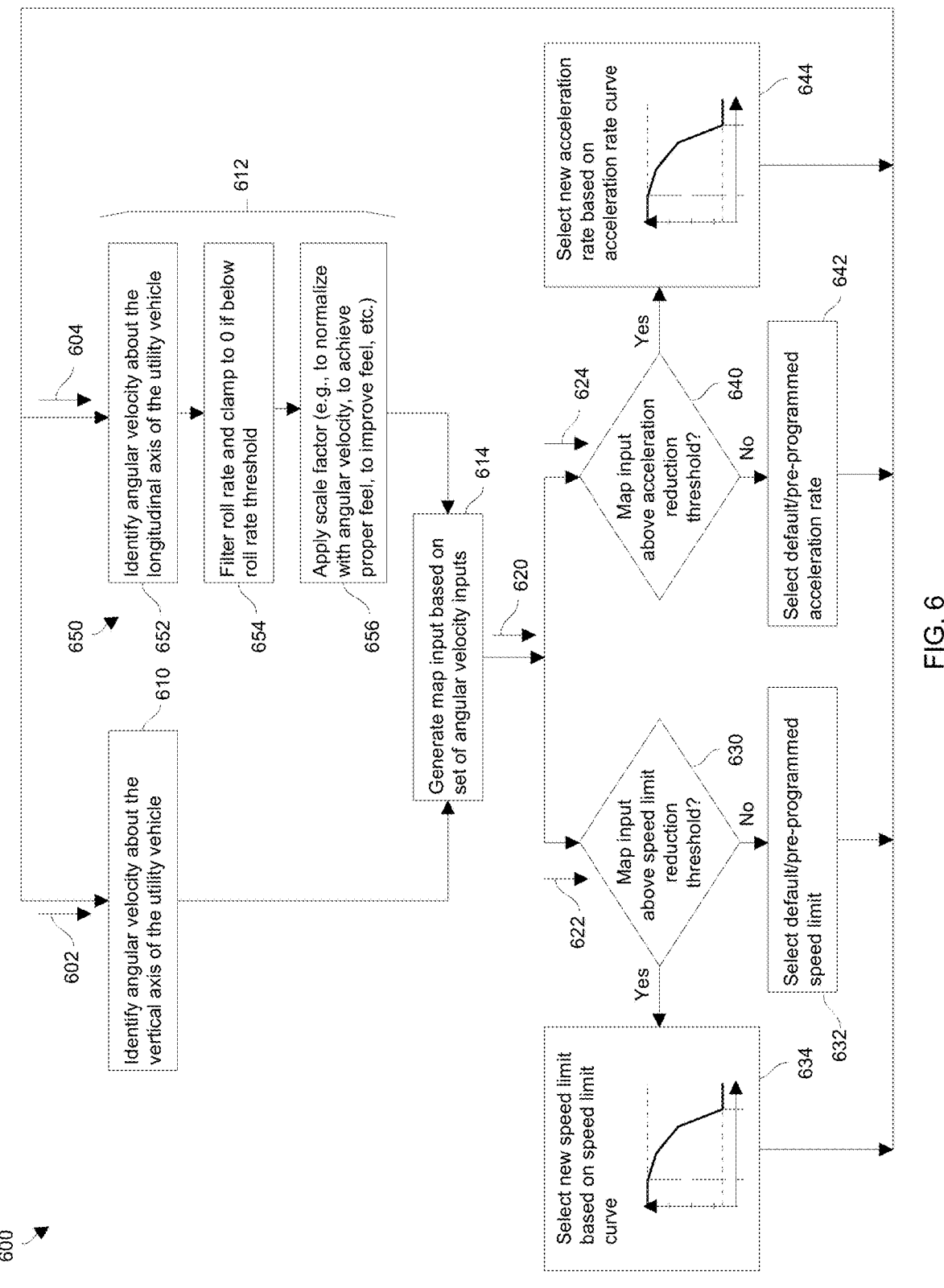
FIG. 6 is a flowchart of another procedure in accordance with certain embodiments.

FIG. 6 is a flowchart of a more-detailed procedure 600 of controlling a utility vehicle (e.g., motion limiting) based on one or more current motion characteristics of the utility vehicle in accordance with certain embodiments. As with the procedure 500 (FIG. 5), the procedure 600 may be performed by specialized circuitry of the utility vehicle such as by a motor controller, a BMS, an external device, other circuitry, combinations thereof, etc. (e.g., also see the controller 316 in FIG. 3).

The procedure 600 begins with multiple paths 602, 604. The path 602 is proceeds along the left side of FIG. 6, and the path 604 proceeds along the right side of FIG. 6.

Regarding the path 602 on the left side, at 610, the specialized circuitry provides a current angular velocity metric for angular velocity about the vertical axis of the utility vehicle (e.g., for turning or cornering). Along these lines, the specialized circuitry receives a set of sensor signals from a set of sensors (e.g., see 504 in FIG. 5), and extracts a value for the current angular velocity metric from the set of sensor signals. For example, the specialized circuitry may obtain/retrieve a set of signals from a set of IMUs of the utility vehicle. Suitable units for the output of 610 is degrees per second.

Similarly, for the path 604 on the right side, at 612, the specialized circuitry provides a current angular velocity metric for angular velocity about the longitudinal axis of the utility vehicle (e.g., for roll). Again, the specialized circuitry supplies a value for the current angular velocity metric based on the set of sensor signals. Suitable units for the output of 612 is degrees per second.

At 614, the specialized circuitry generates a map input metric 620 from the current angular velocity metrics obtained by 610 and 612. In some arrangements, the specialized circuitry aggregates (or sums) the individual current angular velocity metrics from 610 and 612 to provide, as the map input metric 620, a combined (or overall) current angular velocity metric. In some arrangements, the map input metric 620 may be considered a measurement of vehicle stability (i.e., the lower the value the more stable the vehicle).

From 614, the specialized circuitry proceeds again down multiple paths 622, 624. The path 622 determines whether to use an adjusted speed limit or a default speed limit (e.g., pre-programmed by the manufacturer/supplier/user/etc.). The path 624 determines whether to use an adjusted acceleration rate limit or a default (or pre-programmed) acceleration rate limit.

In particular, at 630, the specialized circuitry compares the map input metric 620 to a speed limit reduction threshold. If the map input metric 620 is less than or equal to the speed limit reduction threshold, 630 proceeds to 632. However, if the map input metric 620 is greater than the speed limit reduction threshold, 630 proceeds to 634. At 632, when the map input metric 620 is less than or equal to the speed limit reduction threshold, the specialized circuitry maintains the speed limit of the utility vehicle at the default speed limit (i.e., no intervention). In some arrangements, the motor controller of the utility vehicle persistently stores and uses the default speed limit and the specialized circuitry makes no adjustment. In some arrangements, the specialized circuitry manages the default speed limit and actively directs (e.g., commands) the motor controller to continue using the default speed limit.

At 634, when the map input metric 620 is greater than the speed limit reduction threshold, the specialized circuitry sets the speed limit of the utility vehicle based on the map input metric 620 (i.e., intervention). In some arrangements, the specialized circuitry accesses a map (or lookup table) to ascertain a particular speed limit based on the map input metric 620 (e.g., see FIG. 4). In other arrangements, the specialized circuitry algorithmically derives the particular speed limit using the map input metric 620 as an input. Other operations are suitable for selecting the speed limit of the utility vehicle based on the map input metric 620 (e.g., a combination of accessing a lookup table and applying an algorithm, etc.).

Likewise, at 640 of the path 624, the specialized circuitry compares the map input metric 620 to an acceleration reduction threshold. If the map input metric 620 is less than or equal to the acceleration reduction threshold, 640 proceeds to 642. On the other hand, if the map input metric 620 is greater than the speed limit reduction threshold, 640 proceeds to 644.

At 642, when the map input metric 620 is less than or equal to the acceleration reduction threshold, the specialized circuitry maintains the acceleration rate of the utility vehicle at the default acceleration rate. In some arrangements, the motor controller of the utility vehicle persistently stores and uses the default acceleration rate and the specialized circuitry makes no adjustment. In some arrangements, the specialized circuitry manages the default acceleration rate and actively directs the motor controller to use the default acceleration rate.

At 644, when the map input metric 620 is greater than the acceleration reduction threshold, the specialized circuitry sets the acceleration rate of the utility vehicle based on the map input metric 620. In some arrangements, the specialized circuitry accesses a map (or lookup table) to ascertain a particular acceleration rate based on the map input metric 620 (e.g., see FIG. 4). In other arrangements, the specialized circuitry algorithmically derives the particular acceleration rate using the map input metric 620 as an input (e.g., a metric may be determined using a mathematical function rather than a mapping table). Other operations are suitable for selecting the acceleration rate of the utility vehicle based on the map input metric 620 (e.g., a combination of accessing a lookup table and applying an algorithm, etc.).

Once paths 622 and 624 have completed, the procedure 600 starts again (i.e., repeats). In particular, the specialized circuitry returns to paths 602 and 604. Such operation continues in an ongoing manner while the utility vehicle is being driven. Accordingly, the utility vehicle continues to enjoy motion limiting based on a set of current motion characteristics of the utility vehicle.

At this point, it should be appreciated that, in some respects, the procedure 600 is a more advanced version of at least a portion of the procedure 500 (also see FIG. 5). Along these lines, 610 and 612 correspond to receiving a set of motion signals (also see 504 in the procedure 500 of FIG. 5). Such a set of motion signals indicate a set of current motion characteristics of the utility vehicle (e.g., a set of angular velocities about different axes of the utility vehicle).

Additionally, 614 through 644 correspond to operations involved in changing at least one motion control parameter of the set of motion control parameters which controls motion of the utility vehicle from an initial value to an updated value which is different from the initial value (also see 506 in the procedure 500 of FIG. 5). Here, performing path 622 may result in adjusting the speed limit of the utility vehicle, and performing path 624 may result in adjusting the acceleration rate of the utility vehicle.

It should be further appreciated that, in other embodiments, the procedure 600 is constructed and arranged to adjust different motion control parameters and/or a different number motion control parameters (e.g., one control parameter, three control parameters, and so on). For example, the procedure 600 may be configured to further adjust the deceleration rate of the utility vehicle. As another example, the procedure 600 may be configured to only adjust the speed limit and the deceleration rate. As yet another example, the procedure 600 may be configured to only adjust the speed limit, and so on.

It should be understood that the specialized circuitry may perform additional and/or more detailed operations (e.g., for fine tuning, normalization, improved user satisfaction, combinations thereof, etc.). Such operation may improve motion control effectiveness compared to simply using raw sensor measurements.

For example, 612 may include a series of sub-activities 650. At 652, the specialized circuitry identifies a current angular velocity metric for the utility vehicle about the longitudinal axis (e.g., for roll). At 654, the specialized circuitry clamps (or zeroes out) the magnitude of the current angular velocity metric if the currently identified value is less than a predefined roll rate threshold. At 656, the specialized circuitry applies a scale factor to the value (e.g., if the angular velocity metric was clamped to zero, the value is still zero after scaling).

In some embodiments, the scaling factor is dynamically calculated based on the current top speed setting and/or other factors. In a particular arrangement, the specialized circuitry uses a first scale factor for top speed settings for a first range (e.g., 16 mph or less) and a second scale factor for top speed settings for a second range (e.g., 25 mph or more), with linear interpolation in between those points. Such an arrangement avoids having a single middle ground that would make the logic too intrusive at lower speeds and not intrusive enough at higher speeds.

Moreover, it should be understood that the procedure 600 includes parallel (or side-by-side) paths at certain times. In accordance with certain embodiments, such paths are executed by a single processor (e.g., via time sliced multitasking). In accordance with other embodiments, such paths are executed by respective processing circuits (e.g., via parallel processing). Other configurations are suitable for use as well (e.g., time slicing and parallel processing).

In some embodiments, the motor controller 220 offers several (e.g., many) motion control parameters that can be set to a first set of values to provide certain performance, a second set of values to provide more conservative performance (e.g., less aggressive cornering), a third set of values to provide even more conservative performance (e.g., extremely stable cornering), and so on. Such motion control parameters can be changed dynamically to modify how the utility vehicle 100 performs.

In some embodiments, the specialized circuitry offers different levels of motion control parameter accessibility. Along these lines, the supplier of the motor controller may have "developer level" parameter accessibility, the vehicle manufacturers/dealers may have "technician level" parameter accessibility, operators/users may have "operator level" parameter accessibility, etc.

At a lower level of parameter accessibility (e.g., lower than "developer level"), the utility vehicle 100 may offer the ability to set certain intervention thresholds and/or multiple motion control parameters with a single motion (or stability) control setting. Such a feature enables multiple motion control metrics to be adjusted via just one setting. For example, the setting offered at the "operator level" level may be "off", "mild assist", "moderate assist", and "heavy assist".

When the operator sets the motion control setting to "off", motion control based on current motion characteristics is disabled. Accordingly, the utility vehicle 100 simply operates using default values.

When the operator sets the motion control setting to "mild assist", motion control based on current motion characteristics is enabled and the utility vehicle 100 provides a mild application of motion control based on current motion characteristics. Along these lines, for a particular map input (or stability measure), the specialized circuitry may use certain intervention thresholds and mildly adjust the values for certain parameters. For example, the specialized circuitry may set the stability threshold/map/max deg/s to 20/25/35 deg/s.

When the operator sets the motion control setting to "moderate assist", motion control based on current motion characteristics is enabled and the utility vehicle 100 provides a moderate application of motion control based on current motion characteristics. Along these lines, for the particular map input, the specialized circuitry may use certain other intervention thresholds and moderately adjust the values for certain parameters.

For example, the specialized circuitry may set the stability threshold/map/max deg/s to 15/18/30 deg/s. Here, the stability threshold is used as a reference (e.g., see FIG. 6), map is the map input, and max is the maximum or upper limit.

When the operator sets the motion control setting to "heavy assist", motion control based on current motion characteristics is enabled and the utility vehicle 100 provides a heavy application of motion control based on current motion characteristics. Along these lines, for the particular map input, the specialized circuitry may use yet other intervention thresholds and heavily adjust the values for certain parameters. For example, the specialized circuitry may set the stability threshold/map/max deg/s to Oct. 15, 2020 deg/s.

Of course, other metrics are suitable for use as well. Additionally, other threshold/parameter groupings are suitable for use as well.

As described above, improved techniques are directed to controlling a vehicle 100 based on one or more current motion characteristics of the vehicle 100 (e.g., angular velocity about a vertical axis, angular velocity about a longitudinal axis, combinations thereof, etc.). Along these lines, specialized circuitry may update a set of motion control parameters which controls vehicle motion. Example motion control parameters include the vehicle's speed limit, acceleration rate, deceleration rate, and the like. A suitable vehicle 100 is an electric golf cart or other type of electric utility vehicle, and the currently selected values of such motion control parameters may be enforced by the vehicle's motor controller. Moreover, in some arrangements, the current motion characteristics of the vehicle are sensed by one or more inertial measurement units (IMUs) on board the vehicle 100 (e.g., within the vehicle's motor controller, within a global position system device, within a standalone device, etc.). By changing the value of one or more motion control parameters based on one or more current motion characteristics, the vehicle 100 may enjoy less restrictive motion control in certain situations for convenience (e.g., when traveling straight) and more conservative motion control in other situations for safety (e.g., when making a sharp turn or other cornering maneuver).

While various embodiments of the present disclosure have been particularly shown and described, it will be understood by those skilled in the art that various changes in form and details may be made therein without departing from the spirit and scope of the present disclosure as defined by the appended claims.

Along these lines, the improvements disclosed herein are applicable to various types of vehicular apparatus/equipment. Example apparatus/equipment include speed-controlled vehicles and torque-controlled vehicles.

Additionally, in some embodiments, the above-described motion control features may be enabled/disabled selectively. In particular, such motion control features may be disabled in certain vehicles models/platforms/etc. but enabled in others (e.g., based on vehicle application, licensing, and so on.

In accordance with certain embodiments, utility vehicles enjoy motion limiting based on current vehicle motion characteristics. Examples of such utility vehicles include golf carts, personal transport vehicles, commercial vehicles, specialized vehicles, and the like which can experience dynamic selective reduction of maximum motion control parameters when the utility vehicles are turning (e.g., during cornering). In fact, any industry or product to which stability control may be applied can use the features disclosed herein.

It should be understood that a vehicle occupant's inertia can create the uncomfortable sensation of being pushed away from the direction of turns made by the vehicle. In extreme cases, incidents can occur. Stability control based on inertial measurement unit (IMU) feedback can greatly reduce uncomfortable sensations and incidents by dynamically limiting performance while cornering without affecting normal operation.

In the golf, personal transport vehicle, and small commercial vehicle spaces today, there is believed to be no sensing of cornering or accompanying stability control, incident prevention, or other performance limitation. With the introduction of an IMU in certain motor controllers, new feedback is available on which stability control decisions can be based. In accordance with certain embodiments disclosed herein, logic is able to alter the vehicle's performance when cornering in order to reduce the chances of an incident occurring and/or discomfort to vehicle occupants.

It should be appreciated that, when a vehicle undergoes a sharp turn, inertia can feel like it is pushing occupants toward the outside of the turn. This is uncomfortable for occupants and in extreme cases could result in undesirable incidents.

However, stability control logic is able to alter the vehicle's performance when cornering. Accordingly, the chances of incidents occurring are reduced.

In accordance with certain embodiments, an IMU is included in the system. This typically involves three accelerometers and three gyroscopes which produce acceleration and angular speed readouts in/about three orthogonal coordinated axes. In some embodiments, the IMU is in the motor controller for convenience. In other embodiments, the IMU is a standalone unit or located in another unit such as a fleet management system device (e.g., a global positioning system device).

In some embodiments, logic and calculation is available to transform the IMU readouts to the vehicle's three orthogonal coordinate axes. Such operation provides for more intuitive processing.

With accelerations in and angular speeds about the vehicle's three orthogonal coordinate axes known, further logic is able to reduce the vehicle's performance during cornering.

In some embodiments, the vehicle's angular speed is monitored with respect to flat ground about the vertical (Z) axis along with the rate of change of the vehicle's roll about the longitudinal (X) axis (e.g., see FIG. 1). In certain embodiments, logic adds the angular speed about the Z axis to the roll rate multiplied by a scale factor. The angular speed about the Z axis is a reflection of how rapidly the vehicle is turning, while the scaled roll rate is a reflection of whether the vehicle is entering or exiting a turn and how rapidly this is occurring. Many related parameters are made available for tuning through an external tool such as a diagnostic handset or properly-configured laptop PC.

Using the output of the above-described logic, additional logic is used to selectively adjust the value of one or more motion control parameters. Along these lines, such logic may reduce the maximum speed of the vehicle, reduce the normal acceleration rate of the vehicle, increase the normal deceleration rate of the vehicle, and/or manipulate the special acceleration and deceleration rates used when the top speed is modified.

The improvements disclosed herein may be impactful for electric powered vehicles, rental services and other businesses utilizing vehicles as a form of transportation or equipment. Other industries include those for heavy turf care equipment (large mowers) and for similar systems for speed limiting, deck operation, or other responses. Other types of vehicles include hybrid vehicles, internal combustion engine vehicles, and so on. Such modifications and enhancements are intended to belong to various embodiments of the disclosure.

What is claimed is:

1. A method of controlling a utility vehicle, the method comprising:
   setting a set of motion control parameters which controls motion of the utility vehicle to a set of initial values;
   receiving a set of motion signals from a set of sensors, the set of motion signals indicating a set of current motion characteristics of the utility vehicle; and
   based on the set of motion signals, changing at least one motion control parameter of the set of motion control parameters which controls motion of the utility vehicle from an initial value to an updated value which is different from the initial value;
   wherein the set of current motion characteristics indicated by the set of motion signals includes an angular speed metric for utility vehicle angular speed about a longitudinal axis of the utility vehicle, the angular speed metric being a roll rate metric for a roll rate of the utility vehicle; and
   wherein changing the at least one motion control parameter includes:
   modifying the roll rate metric from an initial roll rate to a zero roll rate in response to the initial roll rate being lower than a predefined roll rate threshold.

2. The method of claim 1 wherein the set of current motion characteristics indicated by the set of motion signals includes a set of angular speed metrics, the set of angular speed metrics including the angular speed metric; and
   wherein changing the at least one motion control parameter includes:
   performing an adjustment operation that adjusts a particular motion control parameter of the set of motion control parameters based on the set of angular speed metrics.

3. The method of claim 2 wherein performing the adjustment operation includes:
   comparing a particular angular speed metric to a predefined threshold, and
   lowering the particular motion control parameter from a first value to a second value in response to the particular angular speed metric exceeding the predefined threshold.

4. The method of claim 3 wherein the set of angular speed metrics further includes another angular speed metric for utility vehicle angular speed about a vertical axis of the utility vehicle; and
   wherein performing the adjustment operation further includes:

prior to comparing the particular angular speed metric to the predefined threshold, generating the particular angular speed metric based on at least one of the angular speed metric and the other angular speed metric.

5. The method of claim 4 wherein the other angular speed metric is a turning rate metric for a turning rate of the utility vehicle;
   and
   wherein generating the particular angular speed metric includes:
   deriving, as the particular angular speed metric, an angular intensity result from the turning rate metric and the roll rate metric.

6. The method of claim 5 wherein the utility vehicle includes a mapping table having entries which map different angular intensity results to respective values for the particular motion control parameter; and
   wherein lowering the particular motion control parameter from the first value to the second value includes:
   performing a mapping table lookup operation which identifies a particular entry of the mapping table based on the derived angular intensity result, and reads the second value from the particular entry.

7. The method of claim 5 wherein, prior to deriving the angular intensity result, the roll rate metric has the initial roll rate; and
   wherein modifying the roll rate metric occurs prior to deriving the angular intensity result.

8. The method of claim 5 wherein, prior to deriving the angular intensity result, the roll rate metric has the initial roll rate; and
   wherein generating the particular angular speed metric further includes:
   prior to deriving the angular intensity result, modifying the roll rate metric from the initial roll rate to a scaled roll rate which is the initial roll rate scaled by a predefined scaling factor.

9. The method of claim 8 wherein the turning rate metric has an unscaled turning rate; and
   wherein deriving the angular intensity result from the turning rate metric and the roll rate metric includes:
   summing the unscaled turning rate of the turning rate metric with the scaled roll rate of the roll rate metric to form the angular intensity result.

10. The method of claim 3 wherein at least a portion of the set of sensors resides in an inertial measurement unit (IMU) within a motor controller of the utility vehicle; and
   wherein performing the adjustment operation further includes:
   prior to comparing the particular angular speed metric to the predefined threshold, generating the particular angular speed metric from at least one IMU reading from the IMU within the motor controller.

11. The method of claim 3 wherein at least a portion of the set of sensors resides in an inertial measurement unit (IMU) within a global position system (GPS) device coupled with a motor controller of the utility vehicle, the GPS device being constructed and arranged to provide GPS device access to the utility vehicle; and
   wherein performing the adjustment operation further includes:
   prior to comparing the particular angular speed metric to the predefined threshold, generating the particular angular speed metric from at least one IMU reading from the IMU within the GPS device.

12. The method of claim 3 wherein the utility vehicle is equipped with at least a global position system (GPS) device coupled with a motor controller, the GPS device being constructed and arranged to provide GPS device access to the utility vehicle, and the motor controller being constructed and arranged to control operation of an electric traction motor of the utility vehicle;

wherein a portion of the set of sensors resides within an inertial measurement unit (IMU) which is external to both the GPS device and the motor controller; and wherein performing the adjustment operation further includes:

prior to comparing the particular angular speed metric to the predefined threshold, generating the particular angular speed metric from at least one IMU reading from the IMU which is external to both the GPS device and the motor controller.

13. The method of claim 3 wherein lowering the particular motion control parameter from the first value to the second value includes:

reducing a maximum speed that a motor controller imposes on the utility vehicle from a first speed to a second speed that is slower than the first speed.

14. The method of claim 3 wherein lowering the particular motion control parameter from the first value to the second value includes:

reducing a maximum acceleration rate that a motor controller imposes on the utility vehicle from a first acceleration rate to a second acceleration rate that is lower than the first acceleration rate.

15. The method of claim 3 wherein lowering the particular motion control parameter from the first value to the second value includes:

reducing a maximum deceleration rate that a motor controller imposes on the utility vehicle from a first deceleration rate to a second deceleration rate that is lower than the first deceleration rate.

16. The method of claim 1 wherein changing the at least one motion control parameter of the set of motion control parameters includes:

changing a maximum speed parameter that a motor controller uses to control speed of the utility vehicle from a first speed to a second speed that is slower than the first speed, and reducing a maximum acceleration rate that the motor controller uses to control acceleration of the utility vehicle from a first acceleration rate to a second acceleration rate that is lower than the first acceleration rate.

17. Electronic circuitry to control a utility vehicle, the electronic circuitry comprising:

a set of sensors;

motor control circuitry constructed and arranged to operate an electric motor for vehicle propulsion; and a controller coupled with the set of sensors and the motor control circuitry, the controller being constructed and arranged to perform a method of:

setting a set of motion control parameters which the motor control circuitry uses to control motion of the utility vehicle to a set of initial values, receiving a set of motion signals from the set of sensors, the set of motion signals indicating a set of current motion characteristics of the utility vehicle, and based on the set of motion signals, changing at least one motion control parameter of the set of motion control parameters which the motor control circuitry uses to control motion of the utility vehicle from an initial value to an updated value which is different from the initial value;

wherein the set of current motion characteristics indicated by the set of motion signals includes an angular speed metric for utility vehicle angular speed about a longitudinal axis of the utility vehicle, the angular speed metric being a roll rate metric for a roll rate of the utility vehicle; and wherein changing the at least one motion control parameter includes:

modifying the roll rate metric from the initial roll rate to a zero roll rate in response to the initial roll rate being lower than a predefined roll rate threshold.

18. Electronic circuitry as in claim 17 wherein the set of current motion characteristics indicated by the set of motion signals includes a set of angular speed metrics, the set of angular speed metrics including the angular speed metric; and wherein changing the at least one motion control parameter includes:

performing an adjustment operation that adjusts a particular motion control parameter of the set of motion control parameters based on the set of angular speed metrics.

19. Electronic circuitry as in claim 18 wherein performing the adjustment operation includes:

comparing a particular angular speed metric to a predefined threshold, and lowering the particular motion control parameter from a first value to a second value in response to the particular angular speed metric exceeding the predefined threshold.

20. A utility vehicle, comprising:

a battery management system (BMS) having a lithium battery;

a utility vehicle propulsion system constructed and arranged to provide utility vehicle propulsion using electric power from the lithium battery; and electronic circuitry coupled with the BMS and the utility vehicle propulsion system, the electronic circuitry being constructed and arranged to perform a method of:

setting a set of motion control parameters which is used to control motion of the utility vehicle to a set of initial values, receiving a set of motion signals from a set of sensors, the set of motion signals indicating a set of current motion characteristics of the utility vehicle, and based on the set of motion signals, changing at least one motion control parameter of the set of motion control parameters which is used to control motion of the utility vehicle from an initial value to an updated value which is different from the initial value;

wherein the set of current motion characteristics indicated by the set of motion signals includes a first angular speed metric for utility vehicle angular speed about a vertical axis of the utility vehicle and a second angular speed metric for utility vehicle angular speed about a longitudinal axis of the utility vehicle;

wherein the first angular speed metric is a turning rate metric for a turning rate of the utility vehicle;

wherein the second angular speed metric is a roll rate metric for a roll rate of the utility vehicle; and wherein changing the at least one motion control parameter includes:

summing an unscaled turning rate of the turning rate metric with a scaled roll rate of the roll rate metric to form an angular intensity result.

* * * * *